United States Patent
Hwang et al.

(10) Patent No.: US 9,420,183 B2
(45) Date of Patent: Aug. 16, 2016

(54) OPTICAL ADJUSTING APPARATUS

(71) Applicant: SAMSUNG ELECTRONICS CO., LTD., Suwon-si, Gyeonggi-do (KR)

(72) Inventors: Young-jae Hwang, Suwon-si (KR); Kwang-seok Byon, Yongin-si (KR); Kyung-bae Lee, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 13/921,390

(22) Filed: Jun. 19, 2013

(65) Prior Publication Data

US 2014/0160311 A1 Jun. 12, 2014

(30) Foreign Application Priority Data

Dec. 12, 2012 (KP) .................. 10-2012-0144525

(51) Int. Cl.
*H04N 5/232* (2006.01)
*G02B 27/64* (2006.01)
*H02K 41/035* (2006.01)

(52) U.S. Cl.
CPC .......... *H04N 5/23248* (2013.01); *G02B 27/646* (2013.01); *H02K 41/0356* (2013.01)

(58) Field of Classification Search
CPC ........... H04N 5/23248; H02K 41/0356; G02B 27/646
USPC .................. 348/208.99, 208.2–208.5, 208.11
See application file for complete search history.

(56) References Cited

U.S. PATENT DOCUMENTS 7,974,528 B2 * 7/2011 Chou .................. 348/208.11
2007/0047942 A1 * 3/2007 Chang et al. ............. 396/133
(Continued)

FOREIGN PATENT DOCUMENTS

| KR | 10-2012-0045333 A | 5/2012 |
| KR | 10-2012-0133904 A | 12/2012 |
| WO | WO 2011/075892 A1 | 6/2011 |

OTHER PUBLICATIONS

PCT Search Report and Written Opinion established for PCT/KR2013/006124 (Nov. 4, 2013).

(Continued)

*Primary Examiner* — Gevell Selby
(74) *Attorney, Agent, or Firm* — Drinker Biddle & Reath LLP

(57) ABSTRACT

The present disclosure relates to an optical adjusting apparatus having an optical adjusting lens for image stabilization and auto focusing, which includes a lens holder that supports the optical adjusting lens; at least one image stabilization VCM actuator unit that moves the lens holder perpendicular to an optical axis of the optical adjusting lens, the image stabilization VCM actuator unit including a magnet with a neutral zone parallel to the optical axis; and an auto focusing VCM actuator unit that moves the lens holder in an optical axis direction, the auto focusing VCM actuator unit including a magnet with a neutral zone orthogonal to the optical axis.

24 Claims, 11 Drawing Sheets

(56) References Cited

U.S. PATENT DOCUMENTS

| | | |
|---|---|---|
| 2008/0309772 A1 | 12/2008 | Ikeda |
| 2009/0252488 A1 | 10/2009 | Eromaki et al. |
| 2010/0149354 A1* | 6/2010 | Makimoto et al. ....... 348/208.99 |
| 2010/0165131 A1 | 7/2010 | Makimoto et al. |
| 2010/0165132 A1* | 7/2010 | Tokiwa et al. ........... 348/208.11 |
| 2011/0002681 A1* | 1/2011 | Yamashita .................... 396/133 |
| 2011/0097061 A1* | 4/2011 | Lee et al. ......................... 396/55 |
| 2011/0176046 A1* | 7/2011 | Hu et al. ........................ 348/335 |
| 2011/0279899 A1 | 11/2011 | Motoike et al. |
| 2012/0229901 A1* | 9/2012 | Moriya et al. ................ 359/557 |
| 2012/0287517 A1 | 11/2012 | Terajima |

OTHER PUBLICATIONS

Extended European Search Report issued for EP 13194027.2 (Apr. 9, 2014).

Examination Report issued for related application AU 2013357963, Jul. 28, 2015, 3 pages.

Examination Report issued in related application AU 2013357963, Nov. 9, 2015, 3 pages.

Examination Report issued in related application AU 2013357963, Feb. 4, 2016, 3 pages.

Notice of Acceptance issued in related application AU 2013357963, Apr. 11, 2016, 2 pages.

* cited by examiner

OPTICAL ADJUSTING APPARATUS

CROSS-REFERENCE TO RELAYED APPLICATIONS

This application claims the priority benefit under 35 U.S.C. §119(a) from Korean Patent Application No. 10-2012-0144525 filed Dec. 12, 2012 in the Korean Intellectual Property Office, the disclosure of which is incorporated herein by reference in its entirety.

BACKGROUND

1. Field

The present disclosure relates to an optical adjusting apparatus. More particularly, the present disclosure relates to an optical adjusting apparatus in which an image stabilization function and an auto focus function are integrated.

2. Related Art

In recent years, slimmer electronic devices such as smart phones, etc. have emerged as a major subject. To create slimmer electronic devices, various attempts to slim down a variety of parts disposed inside the electronic devices have been performed.

Various attempts to slim down camera modules provided in the electronic device such as a smart phone, etc. have also been performed. For example, a design trend of an optical adjusting apparatus included in the camera module is to implement an image stabilization function and an auto focus function within one module.

However, conventional optical pickup apparatuses typically use magnets for implementing the image stabilization function and the auto focus function, which makes accurate position control for auto-focusing difficult.

SUMMARY

The present disclosure has been developed in order to overcome the above drawbacks and other problems associated with the conventional arrangement. An aspect of the present disclosure is to provide an optical adjusting apparatus in which an image stabilization function and an auto focus function are integrated, and that can accurately control a position when auto-focusing, and can thus slim down the apparatus.

The above aspect and/or other feature of the present disclosure can substantially be achieved by providing an optical adjusting apparatus having an optical adjusting lens for image stabilization and auto focusing, which includes a lens holder that supports the optical adjusting lens, at least one image stabilization VCM actuator unit that moves the lens holder perpendicular to an optical axis of the optical adjusting lens, the image stabilization VCM actuator unit including a magnet with a neutral zone parallel to the optical axis, and an auto focusing VCM actuator unit that moves the lens holder in an optical axis direction, the auto focusing VCM actuator unit including a magnet with a neutral zone orthogonal to the optical axis.

The auto focusing VCM actuator unit may be operated independently from the at least one image stabilization VCM actuator unit.

The at least one image stabilization VCM actuator unit may include at least one first image stabilization VCM actuator that moves the lens holder in a first direction perpendicular to the optical axis, and at least one second image stabilization VCM actuator that moves the lens holder in a second direction perpendicular to both the optical axis and the first direction.

The first image stabilization VCM actuator may include a first image stabilization magnet disposed in the lens holder, and a first image stabilization coil disposed to face the first image stabilization magnet so that the first image stabilization coil reacts with the first image stabilization magnet to move the lens holder in the first direction perpendicular to the optical axis. The second image stabilization VCM actuator may include a second image stabilization magnet disposed in the lens holder, and a second image stabilization coil disposed to face the second image stabilization magnet so that the second image stabilization coil reacts with the second image stabilization magnet to move the lens holder in the second direction perpendicular to the first direction.

The auto focusing VCM actuator unit may include an auto focusing magnet disposed to face one of the first image stabilization magnet and the second image stabilization magnet, and an auto focusing coil disposed to face the auto focusing magnet so that the auto focusing coil reacts with the auto focusing magnet to move the lens holder in the optical direction.

The first image stabilization magnet and the second image stabilization magnet may be disposed symmetrically with respect to the optical axis around the optical adjusting lens but may not face each other.

The first image stabilization coil and the second image stabilization coil may be disposed below the first image stabilization magnet and the second image stabilization magnet, respectively.

The auto focusing coil may be disposed behind the auto focusing magnet.

The optical adjusting apparatus may include a first base on which the first image stabilization coil and the second image stabilization coil are disposed.

The auto focusing magnet may be provided in the first base.

The optical adjusting apparatus may include a second base in which the auto focusing coil is disposed.

The optical adjusting apparatus may include a first detecting unit that is disposed in the first base and detects position movement of the lens holder in the first direction, and a second detecting unit that is disposed in the first base and detects position movement of the lens holder in the second direction.

The optical adjusting apparatus may include a third detecting unit that is disposed in the second base and detects position movement of the lens holder in the optical axis direction.

The at least one first image stabilization VCM actuator may include two first image stabilization VCM actuators disposed to face each other around the optical adjusting lens.

The auto focusing VCM actuator unit may be disposed to face the at least one second image stabilization VCM actuator.

The at least one second image stabilization VCM actuator may include two second image stabilization VCM actuators disposed to face each other around the optical adjusting lens.

The auto focusing VCM actuator unit may be disposed to face the at least one first image stabilization VCM actuator.

According to various embodiments of the present disclosure as described above, an optical adjusting apparatus is provided in which image stabilization function and auto focus function are integrated, can accurately control a position when auto focusing, and can be slimmed down.

Other advantages and features of the present disclosure will become apparent from the following detailed description, which, taken in conjunction with the attached drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased to assist in a comprehensive understanding.

Figure 1:
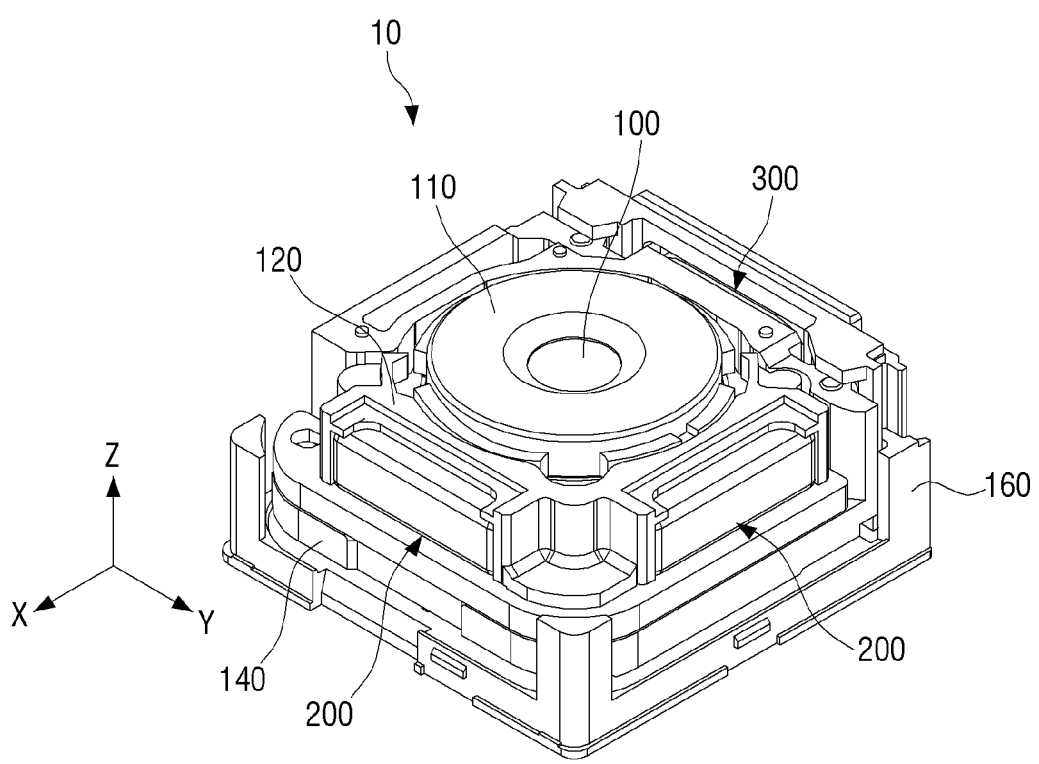
FIG. 1 is a perspective view illustrating an optical adjusting apparatus, according to an embodiment of the present disclosure.
Figure 2:
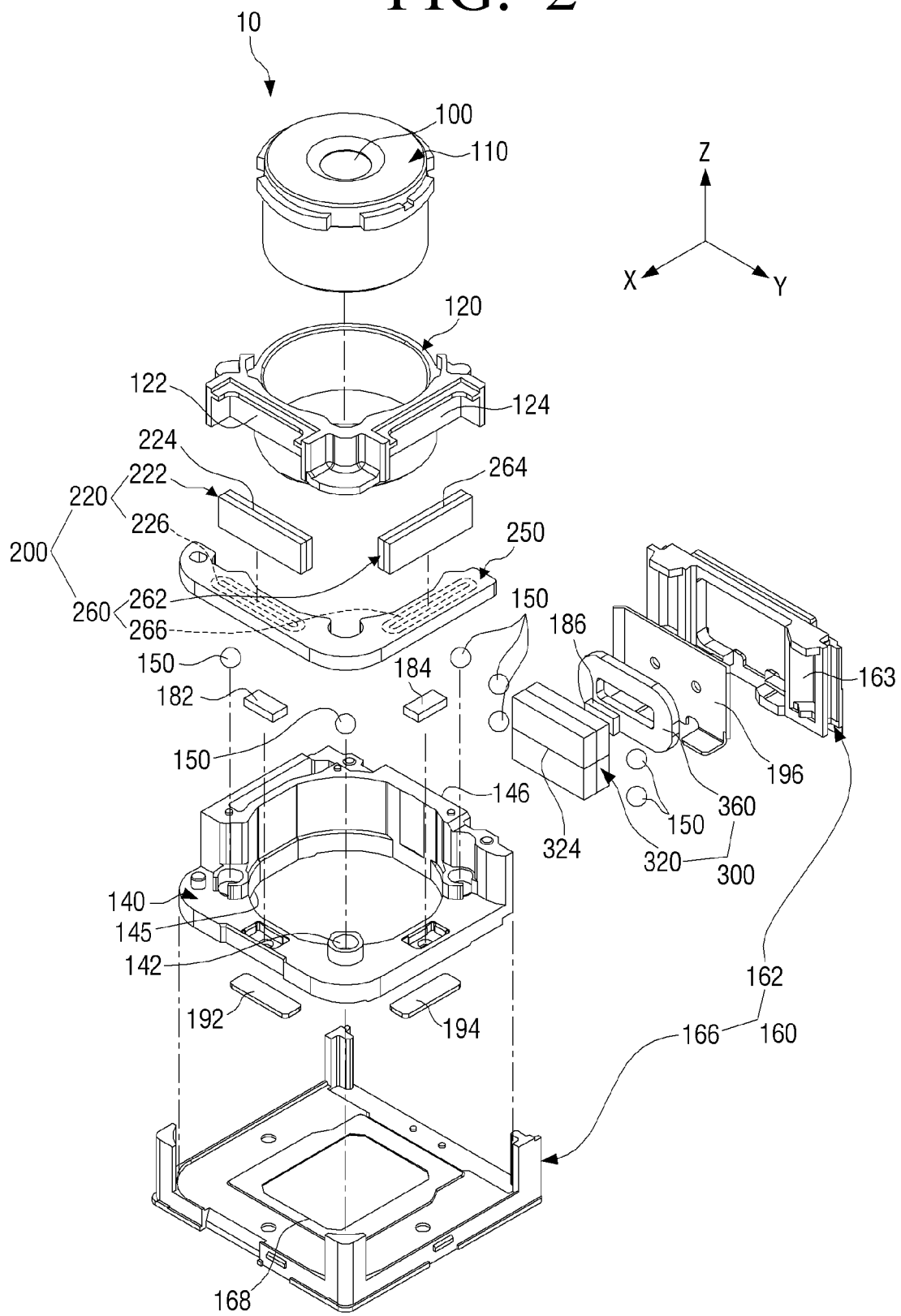
FIG. 2 is an exploded perspective view illustrating the optical adjusting apparatus of FIG. 1.

FIG. 1 is a perspective view illustrating an optical adjusting apparatus 10, according to an embodiment of the present disclosure. FIG. 2 is an exploded perspective view illustrating the optical adjusting apparatus 10 of FIG. 1.

Referring to FIGS. 1 and 2, an optical adjusting apparatus 10 includes an optical adjusting lens 100, a lens barrel 110, a lens holder 120, a first base 140, a second base 160, an image stabilization voice coil motor (VCM) actuator unit 200, and an auto focusing VCM actuator unit 300.

The optical adjusting apparatus 10 is a module in which an image stabilization function for preventing degradation of the sharpness of images due to a hand shake of a user and an auto focus function for automatically adjusting a focus are integrated. Generally, a camera module with a camera function has a module for the image stabilization function that is separate from a module for the auto focus function. In this case, the camera module with separate modules is not suitable for small electronic devices such as smart phones, etc., due to volume of each of the modules. Therefore, an optical adjusting apparatus in which the two functions are integrated is mounted in the small electronic devices.

The optical adjusting lens 100 is moved in a first and second axes plane (X-Y plane) for image stabilization through driving of the image stabilization VCM actuator unit 200, or is moved on along an optical axis (Z-axis) for adjusting a focus through driving of the auto focusing VCM actuator unit 300. The image stabilization VCM actuator unit 200 and the auto focusing VCM actuator unit 300 will be described later.

The lens barrel 110 houses the optical adjusting lens 100, and has a cylindrical shape. An opening (not illustrated) is formed in the lens barrel 110 so that light can penetrate a center of the lens barrel 110 in an optical axis direction (Z-axis direction).

The lens barrel 110 in which the optical adjusting lens 100 is disposed is mounted to the lens holder 120. By driving of the image stabilization VCM actuator unit 200 and the auto focusing VCM actuator unit 300, the lens holder 120 is moved in a first direction (X-axis direction) and a second direction (Y-axis direction) perpendicular to each other, and in the optical axis direction (Z-axis direction) perpendicular to both the first direction (X-axis direction) and the second direction (Y-axis direction).

The first base 140 supports the lens holder 120 to move in the first direction (X-axis direction) perpendicular to the optical axis direction (Z-axis direction) and in the second direction (Y-axis direction) perpendicular to the first direction (X-axis direction). Then, the first base 140 itself moves in the optical axis direction (Z-axis direction) along with the lens holder 120 when adjusting the focus as described below.

The second base 160 supports the first base 140 to move in the optical axis direction (Z-axis direction). In addition, the second base 160 supports various parts of the optical adjusting apparatus 10 as described above.

The image stabilization VCM actuator unit 200 moves the lens holder 120 in the first direction (X-axis direction) and the second direction (Y-axis direction) for the image stabilization.

The auto focusing VCM actuator unit 300 moves the lens holder 120 and the first base 140 in the optical axis direction (Z-axis direction) for auto focusing.

Hereinafter, the image stabilization VCM actuator unit 200 and the auto focusing VCM actuator unit 300 will be described in detail.

Referring to FIG. 2, the image stabilization VCM actuator unit 200 includes a first image stabilization VCM actuator 220 and a second image stabilization VCM actuator 260.

The first image stabilization VCM actuator 220 includes a first image stabilization magnet 222 and a first image stabilization driving unit 226.

The first image stabilization magnet 222 is disposed in a first side 122 of the lens holder 120. The first image stabilization magnet 222 is formed so that a neutral zone 224 thereof is orthogonal to the first direction (X-axis direction) and the second direction (Y-axis direction). In other words, the neutral zone 224 of the first image stabilization magnet 222 is formed parallel to the optical axis direction (Z-axis direction). The neutral zone 224 of the first image stabilization magnet 222 will be described in detail hereinafter with reference to accompanying drawings.

The first image stabilization driving unit 226 is disposed in a position to face the first image stabilization magnet 222. In detail, the first image stabilization driving unit 226 is disposed below the first image stabilization magnet 222.

The first image stabilization driving unit 226 is made up of a coil that can receive current applied from the outside to generate an electromagnetic force. Accordingly, the first image stabilization driving unit 226 performs electromagnetic interaction with the first image stabilization magnet 222.

The second image stabilization VCM actuator 260 includes a second image stabilization magnet 262 and a second image stabilization driving unit 266.

The second image stabilization magnet 262 is disposed in a second side 124 of the lens holder 120 to be arranged asymmetrically with respect to the first image stabilization magnet 222. In other words, the first image stabilization magnet 222 and the second image stabilization magnet 262 are disposed symmetrically with respect to the optical axis but do not face each other (i.e., not opposite of each other). The second image stabilization magnet 262 is formed so that a neutral zone 264 thereof is orthogonal to the first direction (X-axis direction) and the second direction (Y-axis direction) like the first image stabilization magnet 222. In other words, the neutral zone 264 of the second image stabilization magnet 262 is formed parallel to the optical axis direction (Z-axis direction) like the neutral zone 224 in the first image stabilization magnet 222. The neutral zone 264 of the second image stabilization magnet 262 will be described in detail hereinafter with reference to accompanying drawings.

The second image stabilization driving unit 266 is made up of a coil that can receive current applied from the outside to generate an electromagnetic force like the first image stabilization driving unit 226. Accordingly, the second image stabilization driving unit 266 performs electromagnetic interaction with the second image stabilization magnet 262.

Here, the first image stabilization driving unit 226 and the second image stabilization driving unit 266 are made up of printed coils, and are respectively formed in a single driving unit receiving member 250. The driving unit receiving member 250 is provided with the first image stabilization driving unit 226 and the second image stabilization driving unit 266, and is disposed on a top surface of the first base 140.

On the other hand, each of the first image stabilization driving unit 226 and the second image stabilization driving unit 266 may be formed of a normal driving coil other than the printed coil, and may be disposed on the top surface of the first base 140 without the separate driving unit receiving member 250.

A plurality of ball bearings 150 is disposed between the lens holder 120 and the first base 140. The plurality of ball bearings 150 is slidably received in a plurality of ball bearing receiving grooves 142 disposed at intervals on a surface of the first base 140.

Accordingly, the plurality of ball bearings 150 slidably supports the bottom surface of the lens holder 120 to face the top surface of the first base 140. Accordingly, when hand-shake occurs, the lens holder 120 may be moved in the first direction (X-axis direction) and the second direction (Y-axis direction) so as to sharpen images from data obtained from an image pickup device (not illustrated), thereby reducing the hand-shake.

Also, a first light passing hole 145 through which the light having passed through the optical adjusting lens 100 of the lens holder 120 can pass is formed in the first base 140 to penetrate the first base 140. The position and size of the first light passing hole 145 may be determined so that, considering a maximum distance that the optical adjusting lens 100 can move in the first direction (X-axis direction) and the second direction (Y-axis direction), the light having passed through the optical adjusting lens 100 in any position within a moving range of the lens holder 120 can pass through the first light passing hole 145.

The second base 160 includes a side base 162 and a bottom base 166.

The side base 162 forms a side surface of the optical adjusting apparatus 10. The side base 162 is connected to a side surface of the bottom base 166 by welding, screws, or other connectors known in the art. The bottom base 166 forms a bottom surface of the optical adjusting apparatus 10. A second light passing hole 168 through which the light having passed through the optical adjusting lens 100 of the lens holder 120 can pass is formed to penetrate the bottom base 166.

The auto focusing VCM actuator unit 300 includes an auto focusing magnet 320 and an auto focusing driving unit 360.

The auto focusing magnet 320 is disposed in a side surface 146 of the first base 140. The auto focusing magnet 320 is formed so that a neutral zone 324 thereof is orthogonal to the optical axis direction (Z-axis direction). In other words, the neutral zone 324 of the auto focusing magnet 320 is formed parallel to the first direction (X-axis direction) and the second direction (Y-axis direction). The neutral zone 324 of the auto focusing magnet 320 will be described in detail hereinafter with reference to the accompanying drawings.

The auto focusing driving unit 360 is disposed in a position to face the auto focusing magnet 320, and is mounted to the side base 162. In detail, the auto focusing driving unit 360 is disposed behind the auto focusing magnet 320.

The auto focusing driving unit 360 is made up of a coil that can receive current applied from the outside and can generate the electromagnetic force. Accordingly, the auto focusing driving unit 360 performs electromagnetic interaction with the first image stabilization magnet 222.

Since the optical adjusting apparatus 10 according to the present embodiment is provided with the first image stabilization VCM actuator 220 to control movement in the first direction (X-axis direction), the second image stabilization VCM actuator 260 to control movement in the second direction (Y-axis direction), and the auto focusing VCM actuator unit 300 to control movement in the optical axis direction (Z-axis direction), the optical adjusting apparatus 10 can independently control each of the actuators, thereby independently providing a driving force with respect to each of the directions (X-axis, Y-axis, and Z-axis directions).

The plurality of ball bearings 150 is disposed between the first base 140 and the side base 162. The plurality of ball bearings 150 is slidably received in a plurality of ball bearings receiving grooves 163 that are disposed at intervals on a surface of the side base 162.

Accordingly, the plurality of ball bearings 150 slidably supports a side surface of the first base 140 to face a front surface of the side base 162. Therefore, when automatically adjusting the focus, the lens holder 120 can be moved in the optical axis direction (Z-axis direction) by moving the first base 140 in the optical axis direction (Z-axis direction) so that the focus can automatically be adjusted.

Furthermore, the optical adjusting apparatus 10 includes a plurality of detecting units 182, 184, and 186, and a plurality of yokes 192, 194, and 196.

The plurality of detecting units 182, 184, and 186 includes a first detecting unit 182, a second detecting unit 184, and a third detecting unit 186.

The first detecting unit 182 is provided in the first base 140, and is disposed across from the first image stabilization driving unit 226 on the opposite side of the first image stabilization magnet 222. The first detecting unit 182 detects movement of the lens holder 120 in the first direction (X-axis direction), and may consist of a hall sensor that detects changes in the magnitude of voltage or current induced depending on the intensity of magnetic field.

The second detecting unit 184 is provided in the first base 140, and is disposed across from the second image stabilization driving unit 266 on the opposite side of the second image stabilization magnet 262. The second detecting unit 184 detects movement of the lens holder 120 in the second direction (Y-axis direction), and may consist of a hall sensor like the first detecting unit 182.

The third detecting unit 186 is provided in the side base 162, and is disposed on the opposite side of the auto focusing magnet 320. The third detecting unit 186 detects movement of the first base 140 in the optical axis direction (Z-axis direction), and may consist of a hall sensor like the first detecting unit 182 and the second detecting unit 184.

The optical pickup apparatus 10 according to the present embodiment may control the movement of the lens holder 120 to a desired position based on a position of the lens holder 120 detected by the first, second and third detecting unit 182, 184, and 186.

The plurality of yokes 192, 194, and 196 includes a first yoke 192, a second yoke 194, and a third yoke 196.

The first yoke 192 is provided in the first base 140, and is disposed in a position facing the first image stabilization magnet 222. The first yoke 192 and the first image stabilization magnet 222 are magnetically attracted to each other.

The second yoke 194 is provided in the first base 140, and is disposed in a position facing the second image stabilization magnet 262. The second yoke 194 and the second image stabilization magnet 262 are magnetically attracted to each other.

The third yoke 196 is provided in the side base 162, and is disposed in a position facing the auto focusing magnet 320. The third yoke 196 and the auto focusing magnet 320 are magnetically attracted to each other.

Accordingly, the optical adjusting apparatus 10 allows the lens holder 120 to be close to the first base 140 and to be returned to its initial position based on the magnetic attraction generated between each of the first and second yokes 192 and 194 and each of the first and second image stabilization magnets 222 and 262. Also, the optical adjusting apparatus 10 allows the first base 140 to be close to the side base 162 and to be returned to its initial position based on the magnetic attraction generated between the third yoke 196 and the auto focusing magnet 320.

Figure 3:
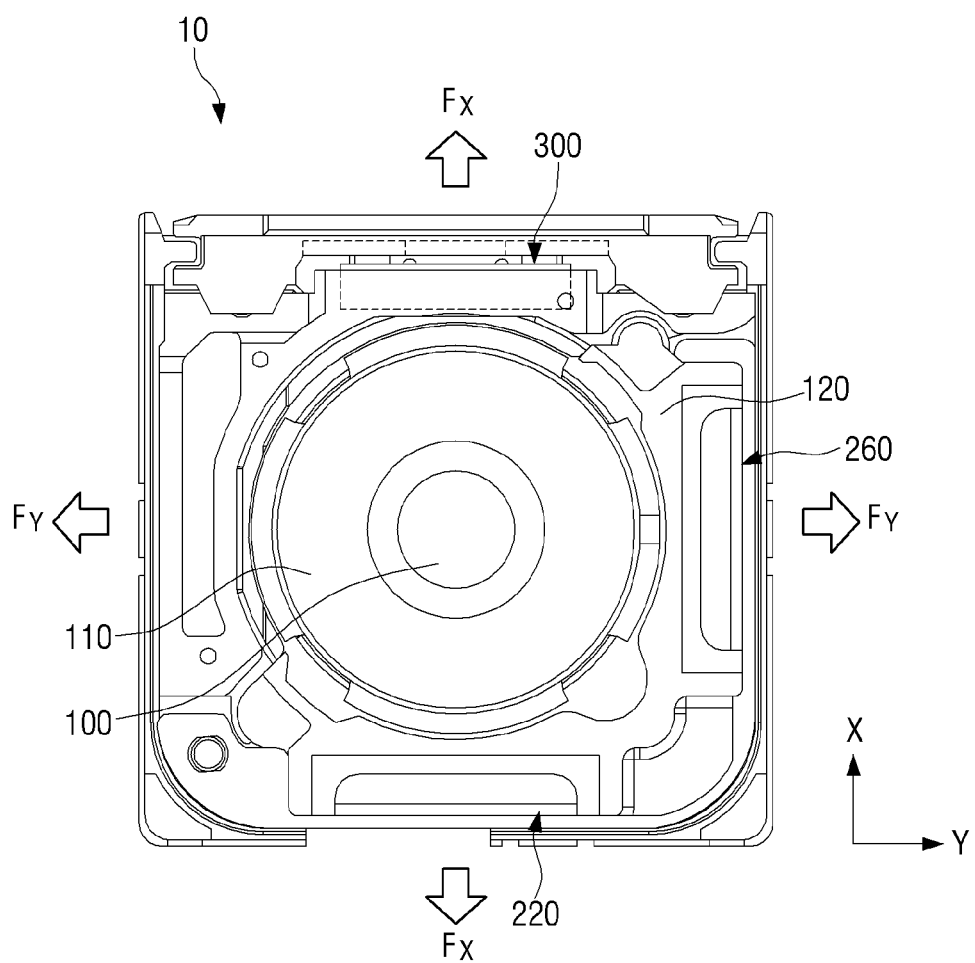
FIG. 3 is a plan view illustrating the optical adjusting apparatus of FIG. 1.

FIG. 3 is a plan view illustrating the optical adjusting apparatus 10 of FIG. 1.

Referring to FIG. 3, the optical adjusting apparatus 10 can move the lens holder 120 in the first direction (X-axis direction) by providing a driving force Fx in the first direction (X-axis direction) using the first image stabilization VCM actuator 220. Then, the optical adjusting apparatus 10 can move the lens holder 120 in the second direction (Y-axis direction) by providing a driving force Fy in the second direction (Y-axis direction) using the second image stabilization VCM actuator 260.

Moreover, when viewed from above, the auto focusing VCM actuator unit 300 is arranged to face the first image stabilization VCM actuator 220 around the optical adjusting lens 100.

Figure 4:
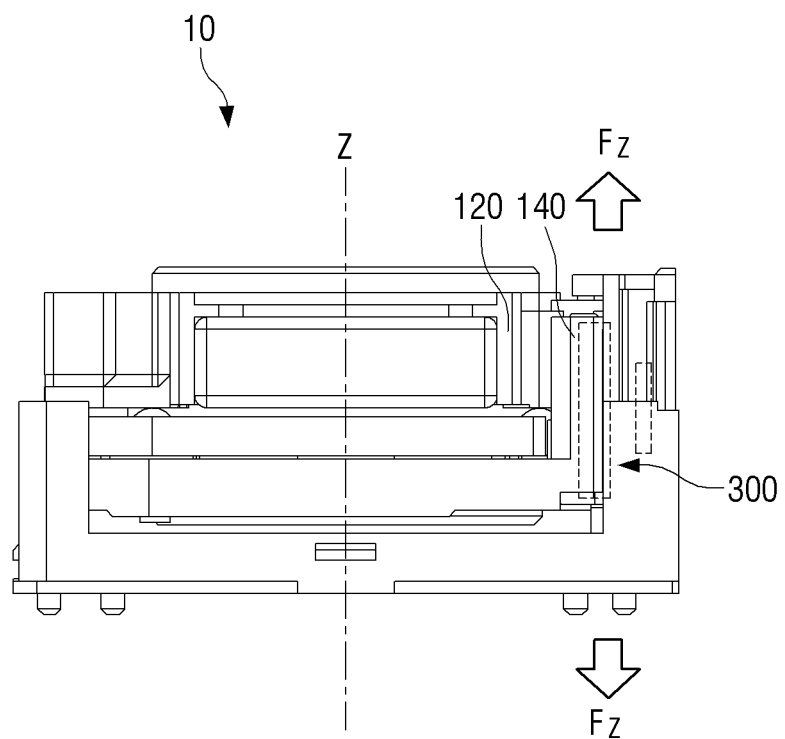
FIG. 4 is a side view illustrating the optical adjusting apparatus of FIG. 1.

FIG. 4 is a side view illustrating the optical adjusting apparatus 10 of FIG. 1.

Referring to FIG. 4, the optical adjusting apparatus 10 can move the lens holder 120 and the first base 140 in the optical axis direction (Z-axis direction) by providing a driving force Fz in the optical axis direction (Z-axis direction) using the auto focusing VCM actuator unit 300.

As a result, the optical adjusting apparatus 10 according to an embodiment can independently control movement according to each of the axis directions using the first image stabilization VCM actuator 220, the second image stabilization VCM actuator 260, and the auto focusing VCM actuator unit 300 provided separately. Therefore, when auto focusing is performed, accuracy of the position control may be improved.

Here, independently means that the driving force Fx of the first direction (X-axis direction) generates only displacement of the first direction (X-axis direction) but does not affect a position of the second direction (Y-axis direction) and the optical axis direction (Z-axis direction), the driving force Fy of the second direction (Y-axis direction) generates only displacement of the second direction (Y-axis direction) but does not affect a position of the first direction (X-axis direction) and the optical axis direction (Z-axis direction), and the driving force Fz of the optical axis direction (Z-axis direction) generates only displacement of the optical axis direction (Z-axis direction) but does not affect a position of the first direction (X-axis direction) and the second direction (Y-axis direction).

Figure 5:
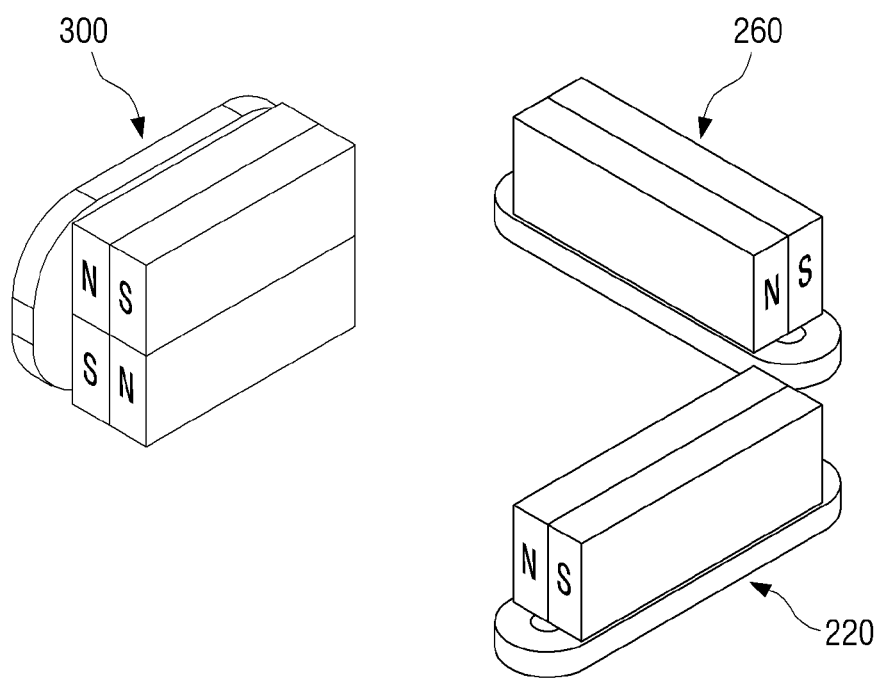
FIG. 5 is a perspective view schematically illustrating arrangement of an image stabilization VCM actuator unit and an auto focusing VCM actuator unit of FIG. 2.

FIG. 5 is a perspective view schematically illustrating arrangement of the image stabilization VCM actuator unit 200 and the auto focusing VCM actuator unit 300 of FIG. 2.

Referring to FIG. 5, the auto focusing VCM actuator unit 300 is disposed in a position facing the first image stabilization VCM actuator 220 as described above. However, the auto focusing VCM actuator unit 300 is not limited by this configuration; therefore, the auto focusing VCM actuator unit 300 may be disposed in a position facing the second image stabilization VCM actuator 260.

FIGS. 6 to 9 are perspective views illustrating relationships between the driving axes and the magnets of FIG. 5.

Figure 6:
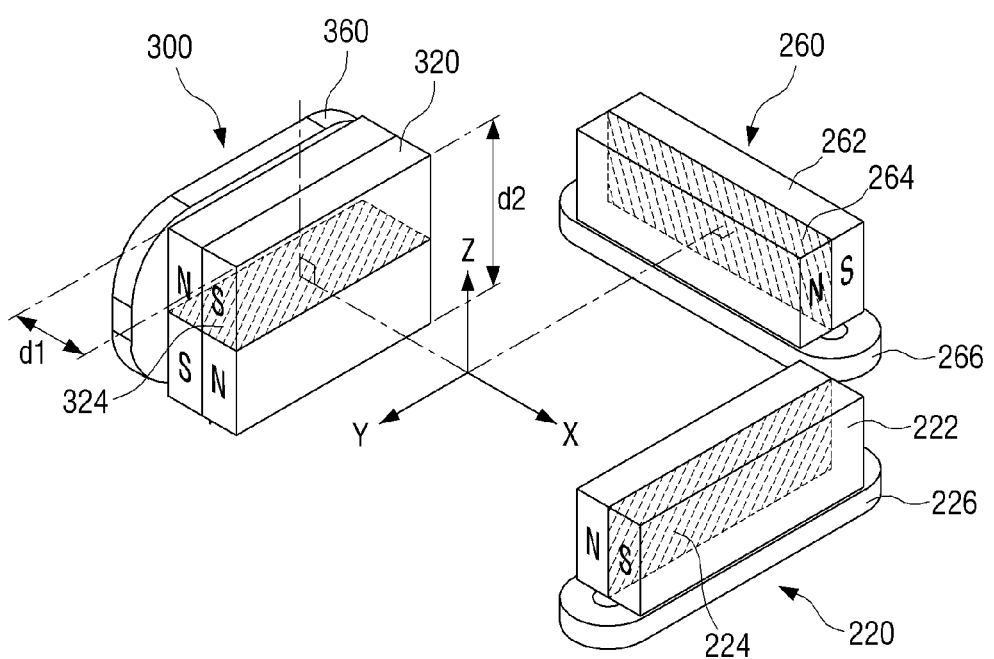
FIGS. 6 to 9 are perspective views illustrating relationships between the driving axes and the magnets of FIG. 5.

Referring to FIG. 6, the neutral zone 224 of the first image stabilization magnet 222, the neutral zone 264 of the second image stabilization magnet 262, and the neutral zone 324 of the auto focusing magnet 320 are formed to be orthogonal to the first direction (X-axis direction), the second direction (Y-axis direction), and the optical axis direction (Z-axis direction), respectively. In other words, the neutral zone 224 of the first image stabilization magnet 222 and the neutral zone 264 of the second image stabilization magnet 262 are formed parallel to the optical axis (Z-axis).

Here, the neutral zone refers to an interface surface between an N pole and an S pole of a magnet. The neutral zones 224, 264, and 324 of the magnets 222, 262, and 320 are formed through a magnetization process. The magnetization process refers to a process of creating a magnet from a ferromagnetic material of non-magnet. The magnetization process applies a strong external magnetic field to the ferromagnetic material to be manufactured into a magnet, thereby creating a permanent magnet. After passing the magnetization process, a surface of the ferromagnetic material that is in contact with a magnetization device applying the external magnetic field becomes an N pole (or an S pole), and the other surface thereof automatically becomes an S pole (or an N pole). At this time, an interface surface between the automatically generated N pole and S pole is called as the neutral zone.

In the present embodiment, the magnets 222, 262, and 320 are manufactured such that the neutral zone 224 of the first image stabilization magnet 222 and the neutral zone 264 of the second image stabilization magnet 262 is formed in a vertical direction in FIG. 6 (Z-axis direction) through the magnetization process, and the neutral zone 324 of the auto focusing magnet 320 is formed in a horizontal direction in FIG. 6 (X-axis or Y-axis direction) through the magnetization process.

Furthermore, the first image stabilization magnet 222 and the second image stabilization magnet 262 are formed through a unipolar magnetization process, and the auto focusing magnet 320 is formed through a polarized magnetization process.

Here, the polarized magnetization process applies the external magnetic field of two directions rather than the external magnetic field of one direction used the unipolar magnetization process. After the magnetization is performed using the polarized magnetization process, one side of the ferromagnetic material becomes the N pole, and the opposite side thereof becomes the S pole, and then, the opposite side of each of the N pole and the S pole becomes an S pole and an N pole. The interface surface between the N pole and the S pole is previously referred to as the neutral zone. In the case of the polarized magnetization process, there is more than one interface surface. However, when a magnetic flux direction is considered, since the flux perpendicularly diverges and converges through the surface in contact with the magnetization device, the interface surface between the N pole and the S pole of the surface in contact with the magnetization device is much more conspicuous than the interface surface between the automatically generated N pole and S pole. Generally, if a polarized magnetization magnet, a multipole magnetization magnet (a magnet with split magnetization more than the polarized magnetization), or a magnet formed as a polarized magnetization magnet by bonding two unipolar magnetization magnets is used, a relatively more conspicuous interface surface is defined as the neutral zone.

In the present embodiment, the auto focusing magnet 320 is manufactured using the polarized magnetization process so that the neutral zone 324 thereof is orthogonal to the optical axis direction (Z-axis direction) as illustrated in FIG. 6. However, this is only one example, therefore, the image stabilization magnet and the auto focusing magnet may be formed through different magnetization processes (unipolar magnetization or split magnetization) as long as the neutral zone thereof can be formed to be orthogonal with respect to the moving direction.

Figure 7:
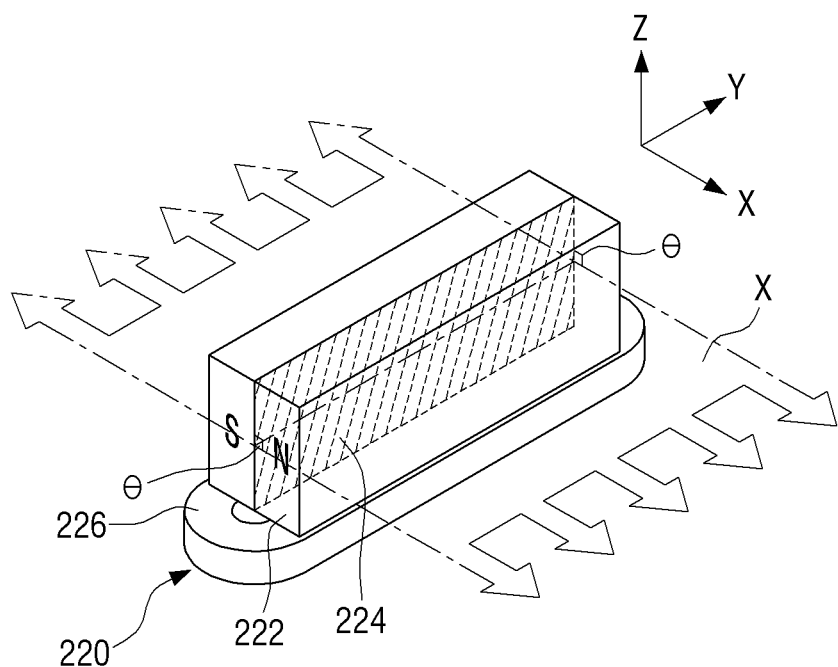
Figure 8:
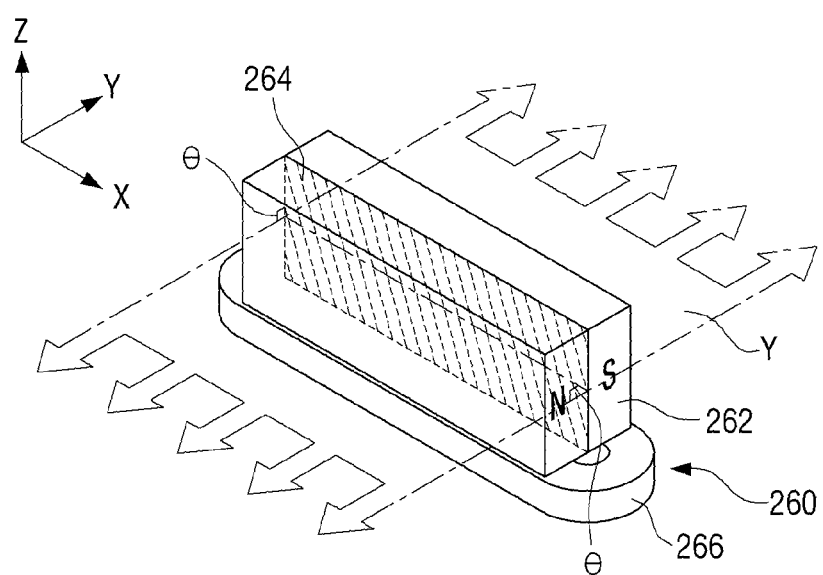
Figure 9:
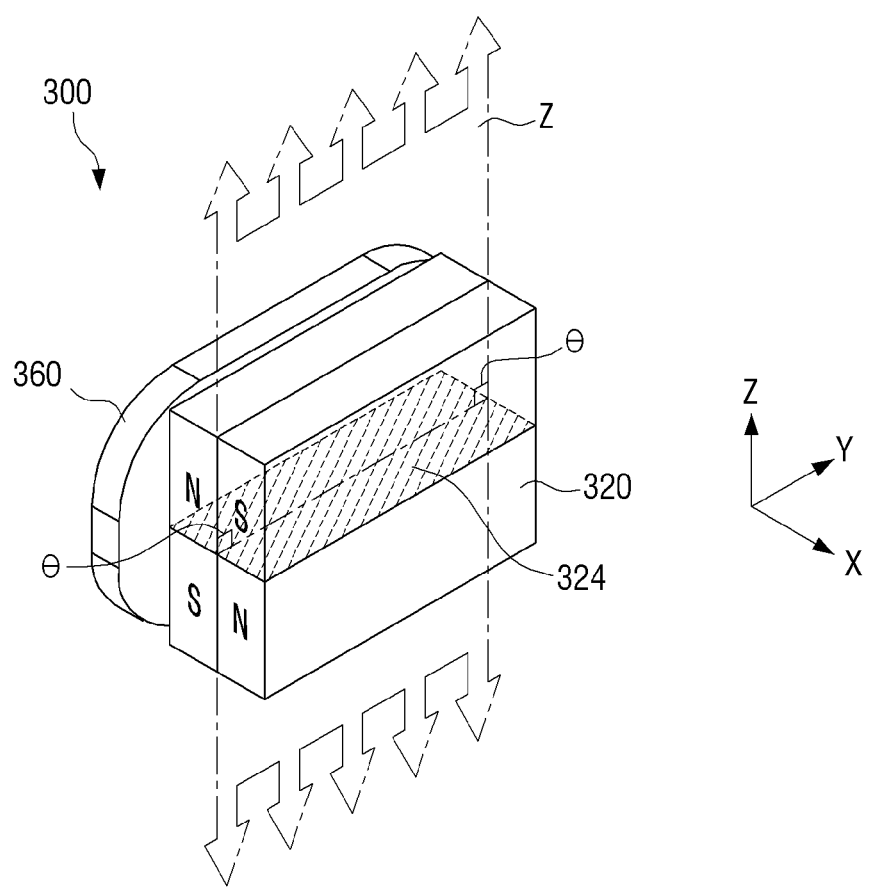

Referring to FIG. 7, the neutral zone 224 of the first image stabilization magnet 222 is orthogonal (i.e., at a right angle θ) to a plane X formed in the first direction (X-axis direction). Referring to FIG. 8, the neutral zone 264 of the second image stabilization magnet 262 is orthogonal (i.e., at a right angle θ) to a plane Y formed in the second direction (Y-axis direction). Referring to FIG. 9, the neutral zone 324 of the auto focusing magnet 320 is orthogonal (i.e., at a right angle θ) to a plane Z formed in the optical axis direction (Z-axis direction).

As described above, the optical adjusting apparatus 10 according to an embodiment of the present disclosure is formed so that the neutral zones 224, 264, and 324 of the magnets 222, 262, and 320 are orthogonal to moving directions along the three axes, respectively. Particularly, since the auto focusing magnet 320 of the optical adjusting apparatus 10, provided for movement in the optical axis direction (Z-axis direction), is formed so that the neutral zone 324 thereof is orthogonal to the optical axis direction (Z-axis direction), the N pole and S pole of the auto focusing magnet 320 are formed vertically.

Accordingly, a width d1 (shown in FIG. 6) of the auto focusing magnet 320 when the N pole and S pole thereof are formed in the vertical direction may be narrower than a width of another auto focusing magnet (not illustrated) in the first direction (X-axis direction) perpendicular to the optical axis direction (Z-axis direction) when the N pole and S pole of the other auto focusing magnet are formed in the horizontal direction (i.e., when the neutral zone is parallel to the optical axis direction). Therefore, in the present embodiment, since the thickness of the auto focusing magnet 320 in the first direction (X-axis direction) can be reduced, the auto focusing VCM actuator unit 300 for auto focusing may be placed to prevent a significant increase in the thickness of the side of the optical adjusting apparatus 10.

Accordingly, since the optical adjusting apparatus 10 according to an embodiment of the present disclosure has a single module in which the image stabilization function and the auto focus function are integrated, movement in each of the three axes directions can be independently controlled, thus achieving a slimmer optical adjusting apparatus 10.

Figure 10:
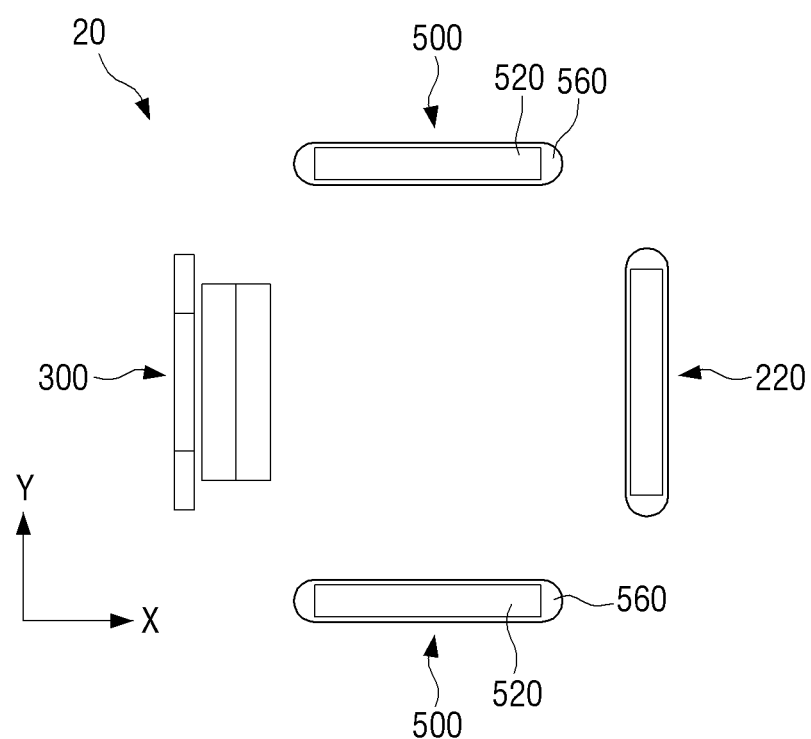
FIG. 10 is a diagram schematically illustrating arrangement of an image stabilization actuator unit and an auto focus actuator unit, according to another embodiment of the present disclosure.

FIG. 10 is a diagram schematically illustrating arrangement of an image stabilization actuator unit and an auto focus actuator unit, according to another embodiment of the present disclosure.

In the present embodiment, the same parts as those of the previous embodiment will be indicated as the same reference numerals, and descriptions thereof will be omitted. Hereinafter, the present embodiment will be described based on the differences from the previous embodiment.

Referring to FIG. 10, an optical adjusting apparatus 20 includes a first image stabilization VCM actuator 220, a second image stabilization VCM actuator 500, and an auto focusing VCM actuator unit 300.

The second image stabilization VCM actuator 500 includes a second image stabilization magnet 520 and a second image stabilization driving unit 560. The shape and function of each of the second image stabilization magnet 520 and the second image stabilization driving unit 560 are the same as those of the previous embodiment (e.g., the second image stabilization magnet 262 and the second image stabilization driving unit 266 illustrated in FIG. 2); therefore, description thereof will be omitted.

Two second image stabilization VCM actuators 500 are provided, and each of the two second image stabilization VCM actuators 500 is disposed to face each other in the second direction (Y-axis direction). Since the optical adjusting apparatus 20 according to the present embodiment is equipped with a plurality of second image stabilization VCM actuators 500 to provide the driving force in the second direction (Y-axis direction), driving efficiency of the second direction (Y-axis direction) may be further increased.

Figure 11:
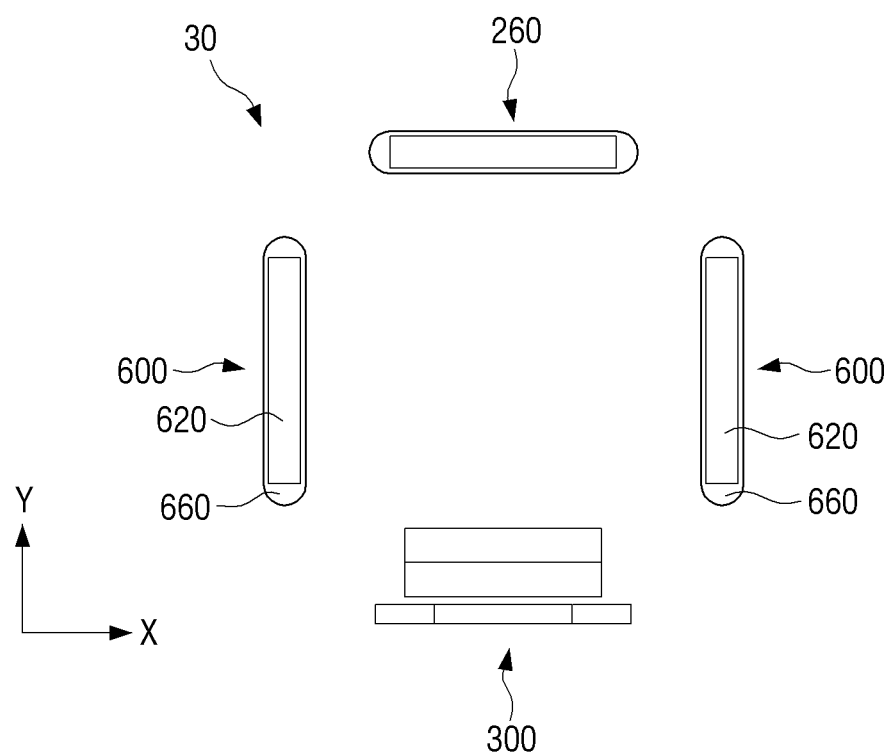
FIG. 11 is a diagram schematically illustrating arrangement of an image stabilization actuator unit and an auto focus actuator unit, according to yet another embodiment of the present disclosure.

FIG. 11 is a diagram schematically illustrating arrangement of an image stabilization actuator unit and an auto focus actuator unit, according to yet another embodiment of the present disclosure.

In the present embodiment, the same parts as those of the previous embodiment will be indicated as the same reference numerals, and descriptions thereof will be omitted. Hereinafter, the present embodiment will be described based on the differences from the previous embodiment.

Referring to FIG. 11, an optical adjusting apparatus 30 includes a first image stabilization VCM actuator 600, a second image stabilization VCM actuator 260, and an auto focusing VCM actuator unit 300.

The first image stabilization VCM actuator 600 includes a first image stabilization magnet 620 and a first image stabilization driving unit 660. The shape and function of each of the first image stabilization magnet 620 and the first image stabilization driving unit 660 are the same as those of the previous embodiment (e.g., the first image stabilization magnet 222 and the first image stabilization driving unit 226 illustrated in FIG. 2); therefore, description thereof will be omitted.

Two first image stabilization VCM actuators 600 are provided, and each of the first image stabilization VCM actuators

600 is disposed to face each other in the first direction (X-axis direction). Accordingly, the second image stabilization VCM actuator 260 and the auto focusing VCM actuator unit 300 are disposed to face each other in the second direction (Y-axis direction).

Since the optical adjusting apparatus 30 according to the present embodiment is equipped with a plurality of first image stabilization VCM actuators 600 to provide the driving force in the first direction (X-axis direction), driving efficiency of the first direction (X-axis direction) may be further increased.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An optical adjusting apparatus having an optical adjusting lens for image stabilization and auto focusing comprising:
    a lens holder that supports the optical adjusting lens;
    at least one image stabilization voice coil motor (VCM) actuator unit that moves the lens holder perpendicular to an optical axis of the optical adjusting lens;
    a first base that supports the lens holder such that the lens holder moves in a direction perpendicular to the optical axis,
    a second a base that supports the first base such that the first base moves in the optical axis direction; and
    an auto focusing VCM actuator unit that moves the lens holder in an optical axis direction, the auto focusing VCM actuator comprises:
        an auto focusing magnet that moves with the lens holder; and
        an auto focusing coil disposed opposite to the auto focusing magnet,
        wherein the auto focusing magnet is disposed between the lens holder and the auto focusing coil, and the auto focusing coil interacts with the auto focusing magnet to move the lens holder in the optical axis direction,
    wherein a plurality of ball bearings are disposed between the first base and the lens holder and a plurality of ball bearing are disposed between the first base and the second base.

2. The optical adjusting apparatus of claim 1, wherein the auto focusing VCM actuator unit is operated independently from the at least one image stabilization VCM actuator unit.

3. The optical adjusting apparatus of claim 2, wherein the at least one image stabilization VCM actuator unit comprises:
    at least one first image stabilization VCM actuator that moves the lens holder in a first direction perpendicular to the optical axis; and
    at least one second image stabilization VCM actuator that moves the lens holder in a second direction perpendicular to both the optical axis and the first direction.

4. The optical adjusting apparatus of claim 3, wherein
    the at least one first image stabilization VCM actuator comprises:
        a first image stabilization magnet disposed in the lens holder; and
        a first image stabilization coil disposed to face the first image stabilization magnet so that the first image stabilization coil reacts with the first image stabilization magnet to move the lens holder in the first direction, and
    the at least one second image stabilization VCM actuator comprises:
        a second image stabilization magnet disposed in the lens holder; and
        a second image stabilization coil disposed to the second image stabilization magnet so that the second image stabilization coil reacts with the second image stabilization magnet to move the lens holder in the second direction perpendicular to the first direction.

5. The optical adjusting apparatus of claim 4, wherein the auto focusing magnet is disposed opposite to one of the first image stabilization magnet and the second image stabilization magnet.

6. The optical adjusting apparatus of claim 4, wherein the first image stabilization magnet is disposed asymmetrically with respect to the second image stabilization magnet.

7. The optical adjusting apparatus of claim 4, wherein the first image stabilization coil is disposed below the first image stabilization magnet, and the second image stabilization coil is disposed below the second image stabilization magnet.

8. The optical adjusting apparatus of claim 4, wherein each of the first image stabilization coil and the second image stabilization coil comprises a printed coil.

9. The optical adjusting apparatus of claim 5, wherein the auto focusing coil is disposed behind the auto focusing magnet on a basis of the lens holder.

10. The optical adjusting apparatus of claim 5, wherein the first image stabilization coil and the second image stabilization coil are disposed on the first base.

11. The optical adjusting apparatus of claim 10, wherein the auto focusing magnet is provided in the first base.

12. The optical adjusting apparatus of claim 11, wherein the auto focusing coil is disposed on the second base.

13. The optical adjusting apparatus of claim 10, further comprising:
a first detecting unit that is disposed in the first base and detects position movement of the lens holder in the first direction; and
a second detecting unit that is disposed in the first base and detects position movement of the lens holder in the second direction.

14. The optical adjusting apparatus of claim 12, further comprising:
a third detecting unit that is disposed in the second base and detects position movement of the lens holder in the optical axis direction.

15. The optical adjusting apparatus of claim 3, wherein the at least one first image stabilization VCM actuator comprises two first image stabilization VCM actuators disposed to face each other around the optical adjusting lens.

16. The optical adjusting apparatus of claim 15, wherein the auto focusing VCM actuator unit is disposed opposite to the at least one second image stabilization VCM actuator.

17. The optical adjusting apparatus of claim 3, wherein the at least one second image stabilization VCM actuator comprises two second image stabilization VCM actuators disposed opposite to each other on a basis of the optical adjusting lens.

18. The optical adjusting apparatus of claim 17, wherein the auto focusing VCM actuator unit is disposed opposite to the at least one first image stabilization VCM actuator.

19. The optical adjusting apparatus of claim 1, wherein a plurality of ball bearing are disposed between the first base and the second base.

20. An optical adjusting apparatus, comprising:
a lens holder that supports an optical adjusting lens;
an auto focusing voice coil motor (VCM) actuator unit that moves the lens holder along an optical axis of the optical adjusting lens;
at least one image stabilization VCM actuator that moves the lens holder perpendicular to the optical axis;
a first base that supports the lens holder such that the lens holder moves in a direction perpendicular to the optical axis; and
a second base that supports the first base such that the first base moves in the optical axis direction;
wherein the auto focusing VCM actuator unit comprises an auto focusing magnet fixed to the first base and an auto focusing coil fixed to the second base so that the auto focusing coil is disposed opposite to the auto focusing magnet,
wherein a plurality of ball bearings are disposed between the first base and the lens holder and a plurality of ball bearing are disposed between the first base and the second base.

21. The optical adjusting apparatus of claim 20, wherein the image stabilization VCM actuator comprises:
at least one first image stabilization VCM actuator to move the lens holder in a first direction; and
at least one second image stabilization VCM actuator to move the lens holder in a second direction orthogonal to the first direction.

22. The optical adjusting apparatus of claim 21, wherein:
the first image stabilization VCM actuator comprises:
a first image stabilization magnet disposed in the lens holder; and
a first image stabilization coil disposed opposite to the first image stabilization magnet to move the lens holder in the first direction; and
the second image stabilization VCM actuator comprises:
a second image stabilization magnet disposed on the lens holder; and
a second image stabilization coil disposed opposite to the second image stabilization magnet to move the lens holder in the second direction.

23. The optical adjusting apparatus of claim 22, wherein the auto focusing magnet is disposed opposite to one of the first image stabilization magnet and the second image stabilization magnet.

24. The optical adjusting apparatus of claim 22, wherein the first image stabilization magnet is disposed asymmetrically with respect to the second image stabilization magnet.

* * * * *